Jan. 20, 1953
L. W. ALDRIDGE
2,626,042
AUTOMATIC WEIGHING MACHINE AND
FEED CONTROL MEANS THEREFOR
Filed June 21, 1948
9 Sheets-Sheet 4
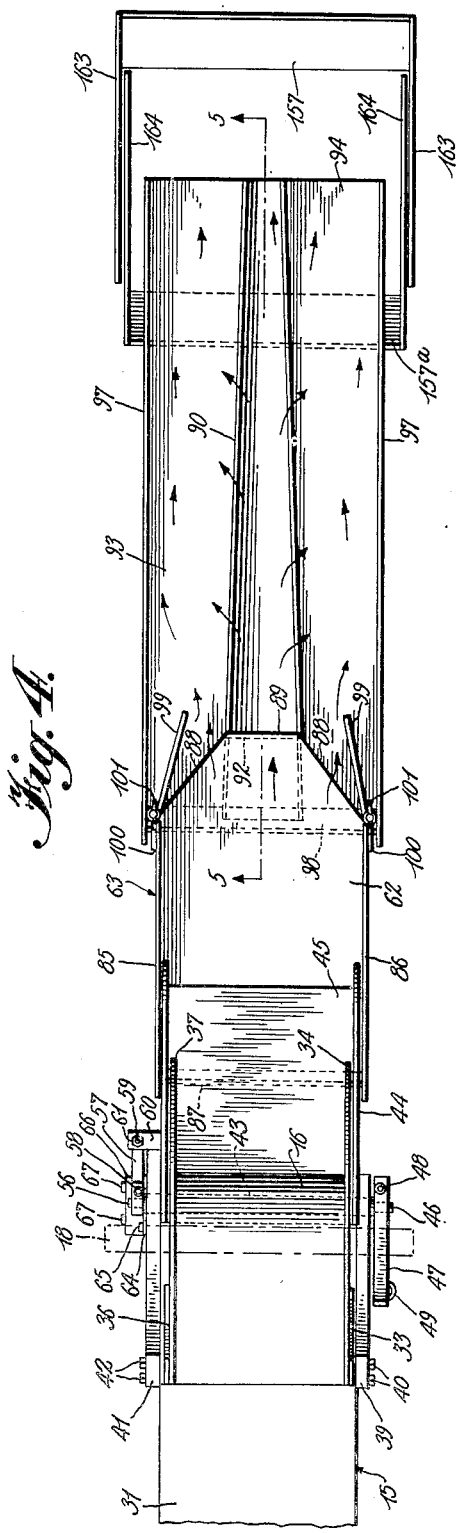
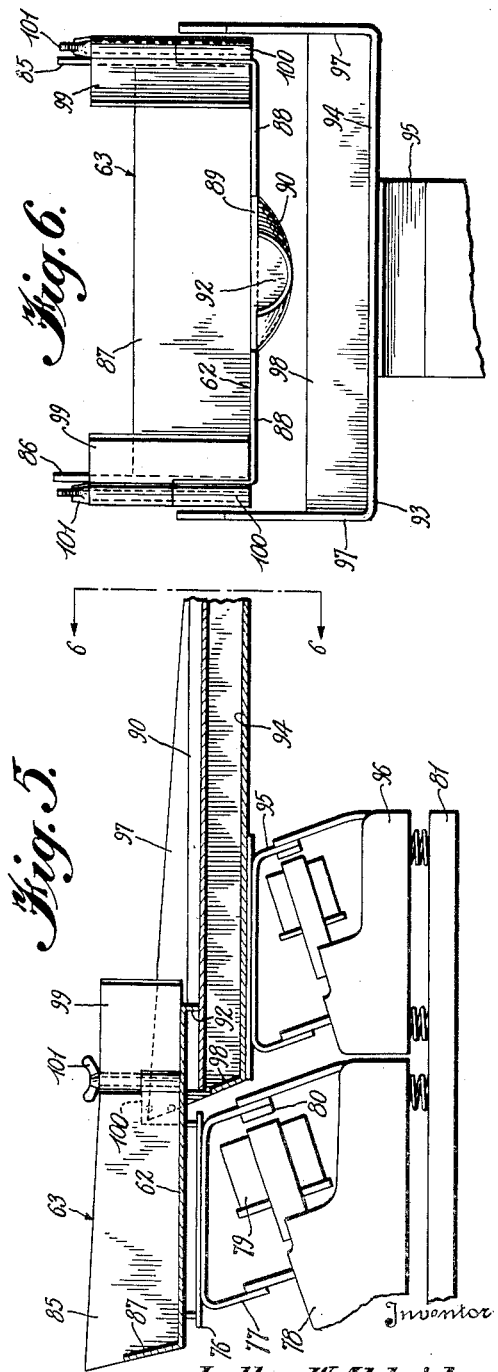
Inventor
Luther W. Aldridge
By Bacon + Thomas
Attorneys

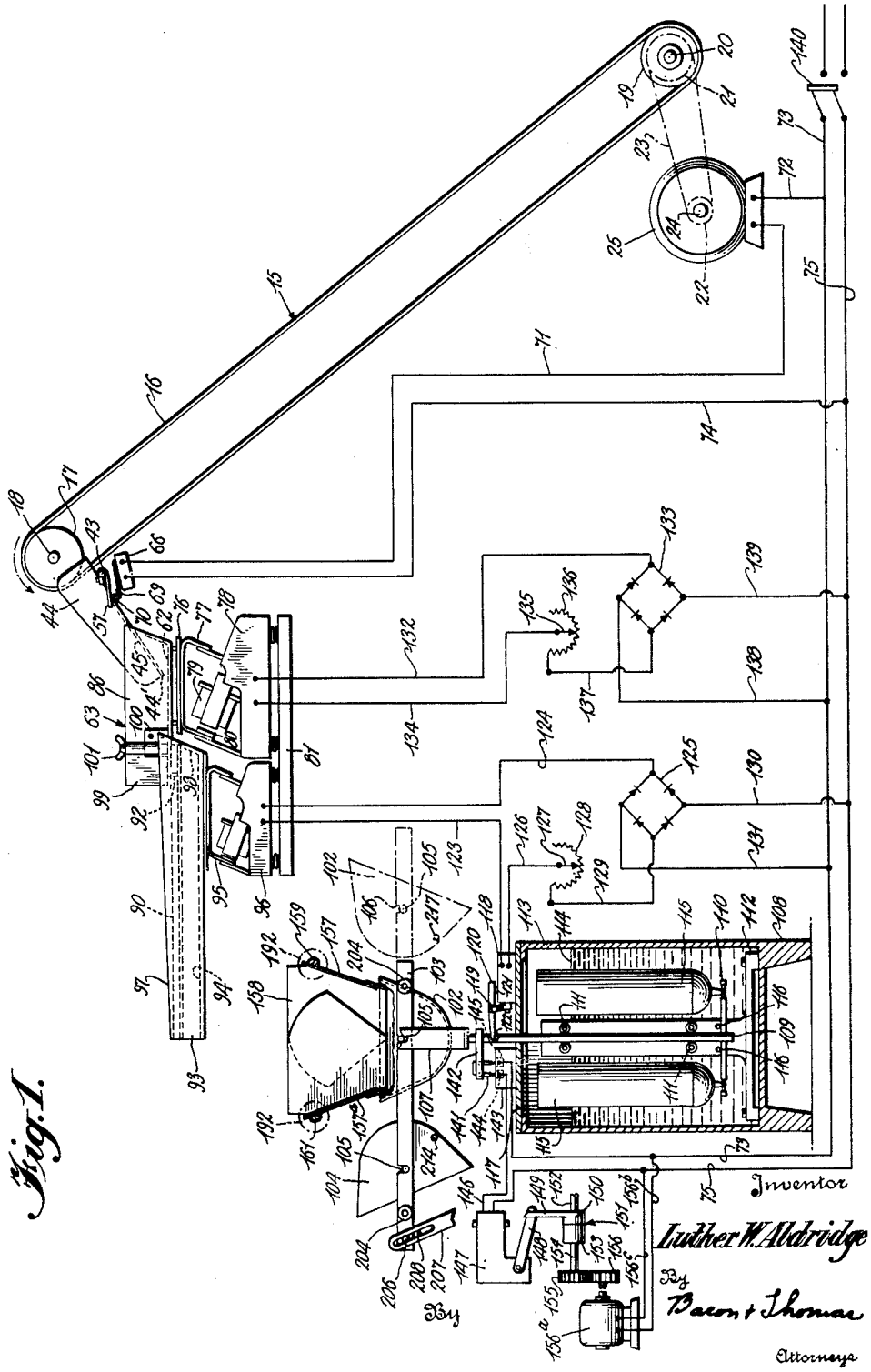

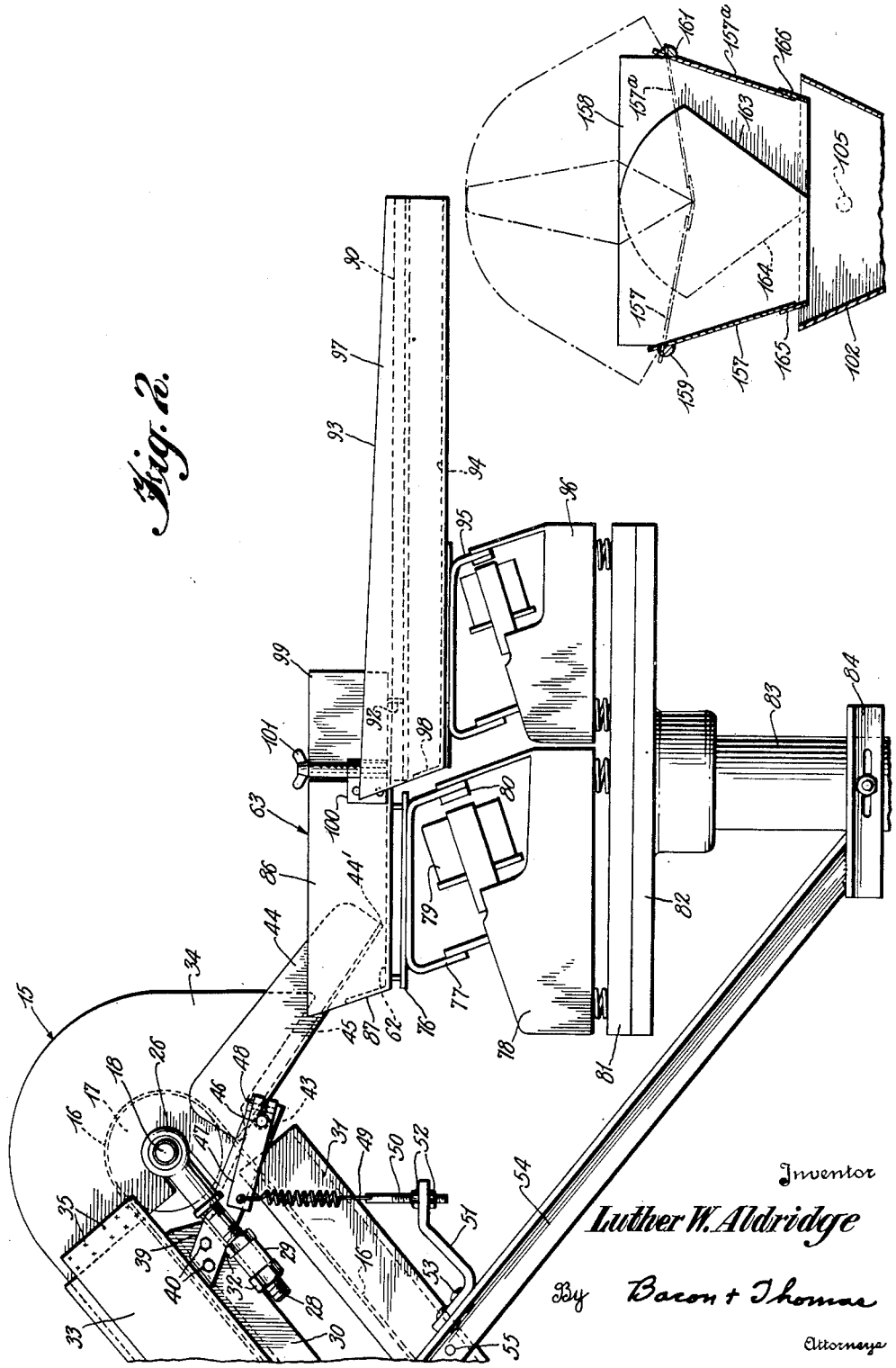

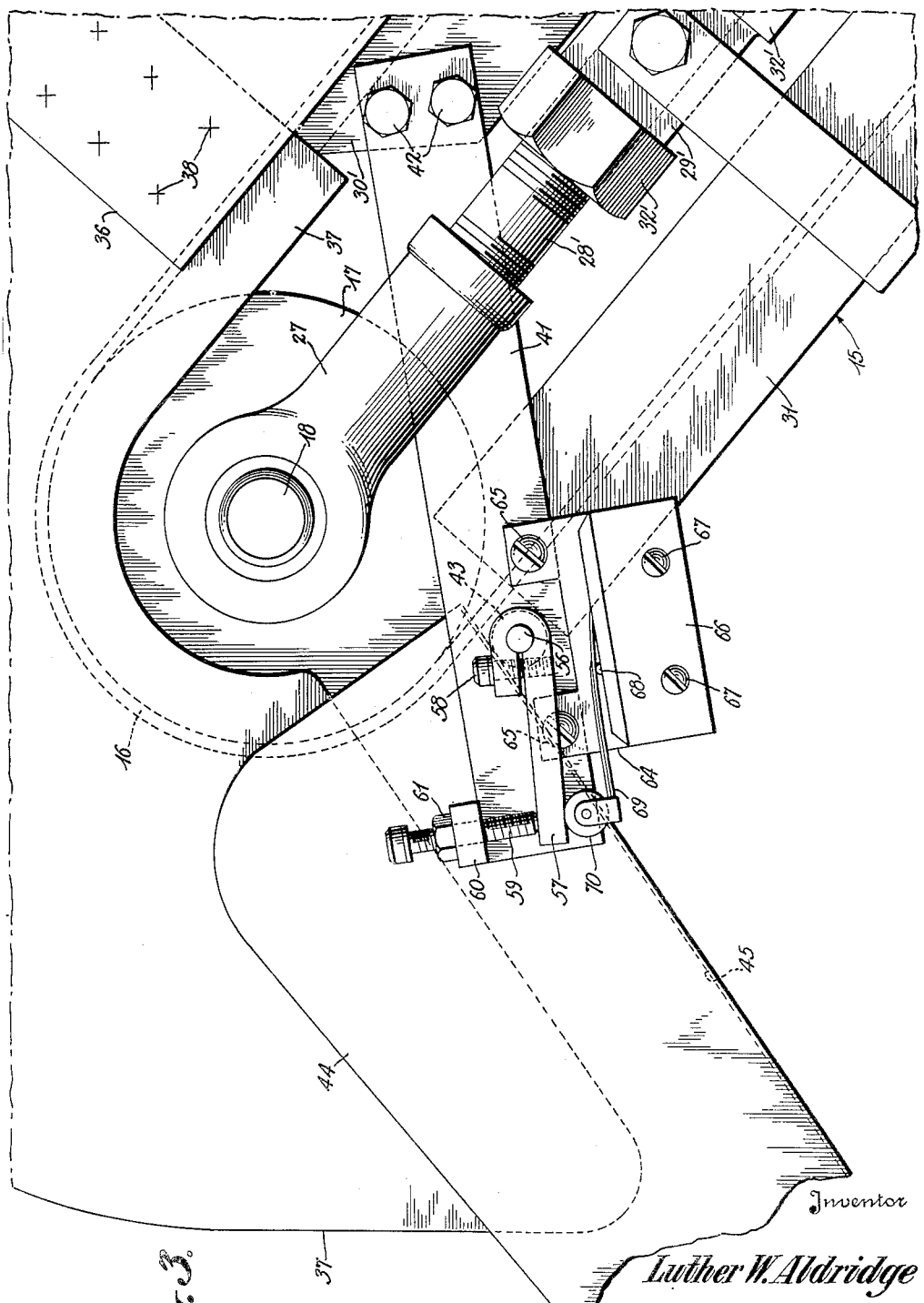

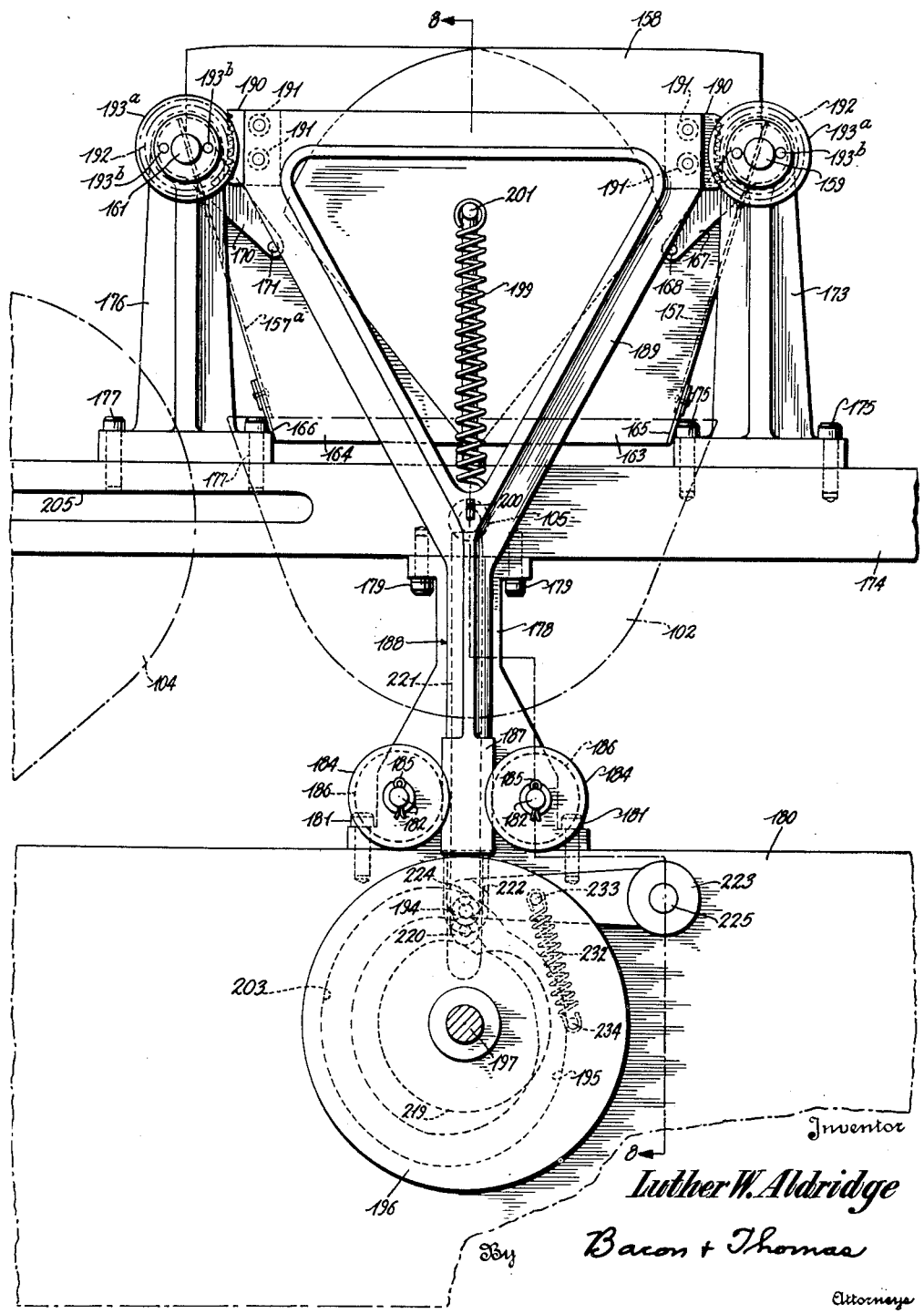

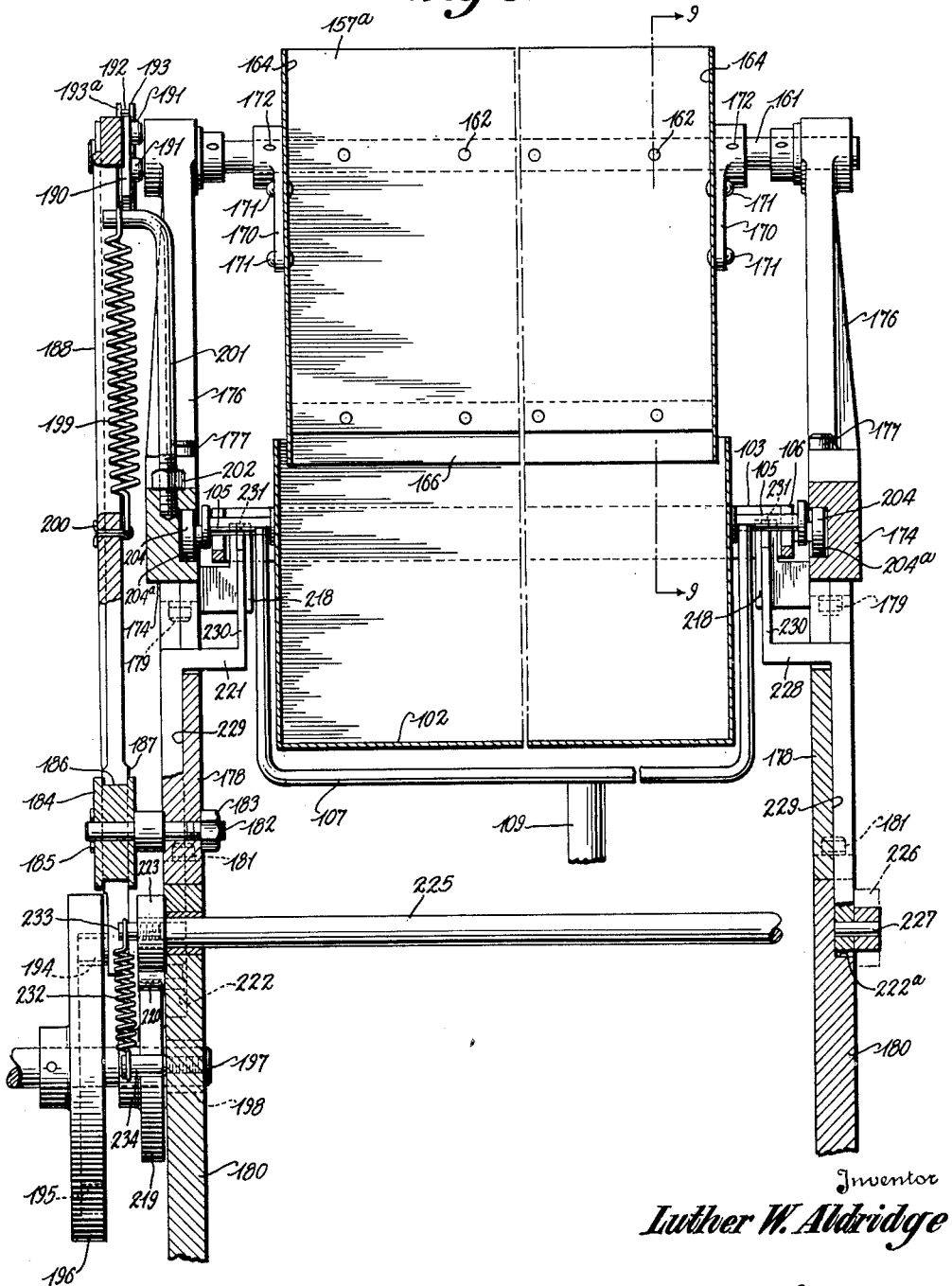

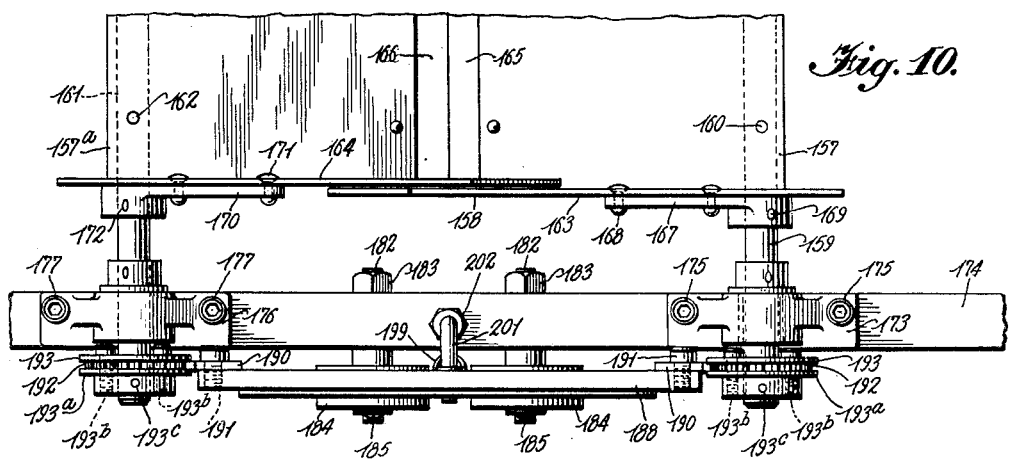
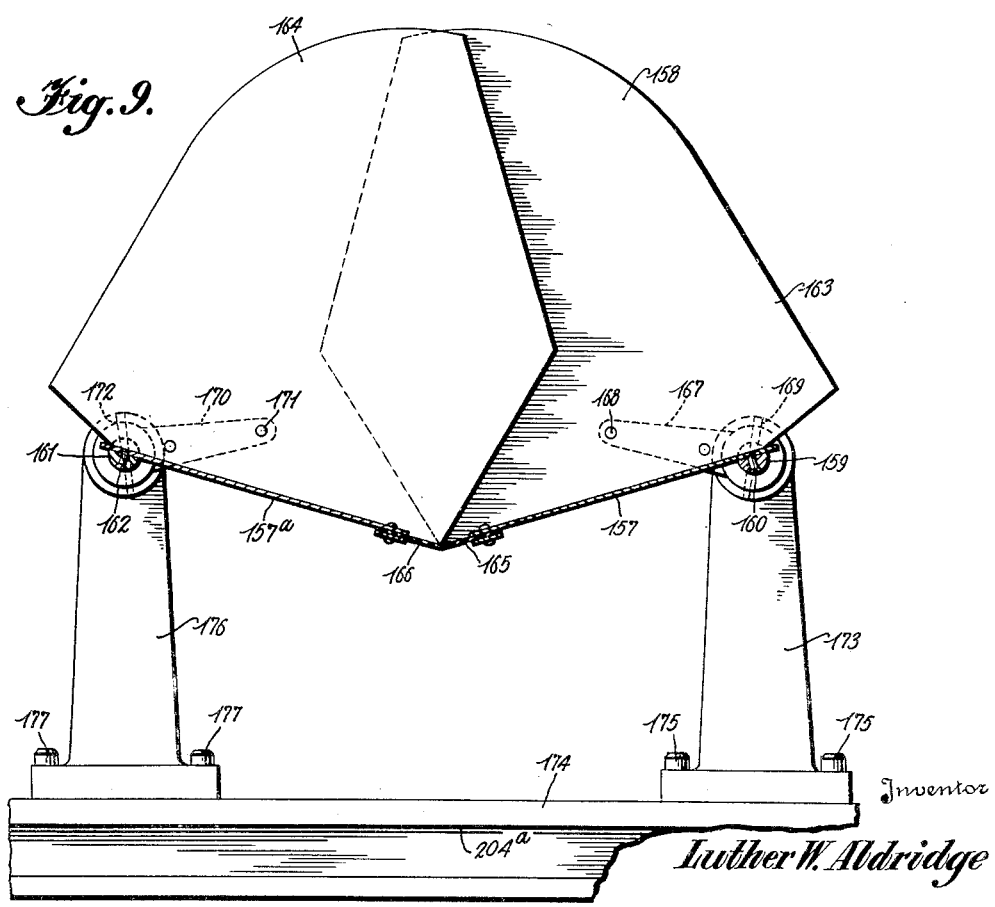

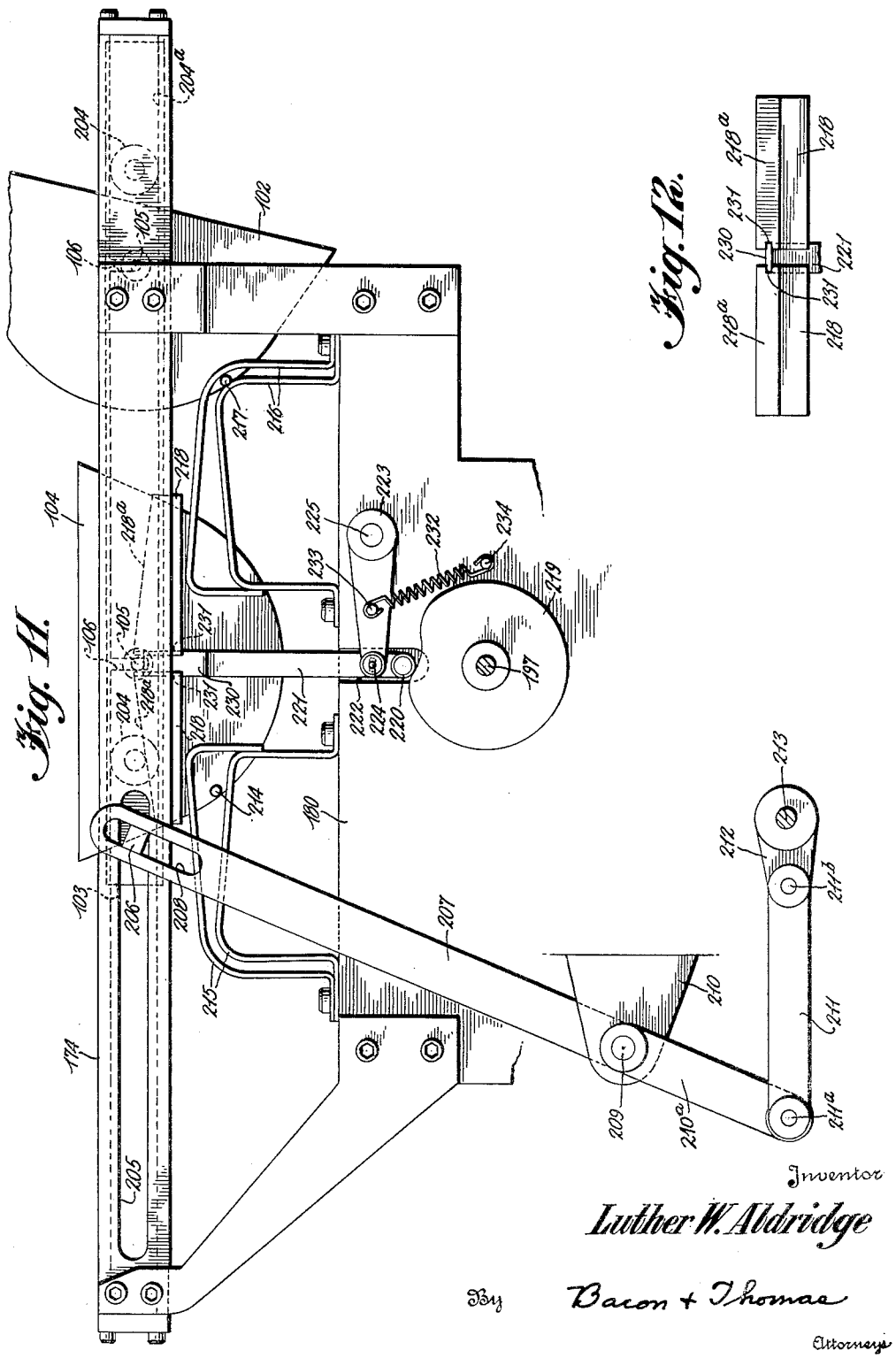

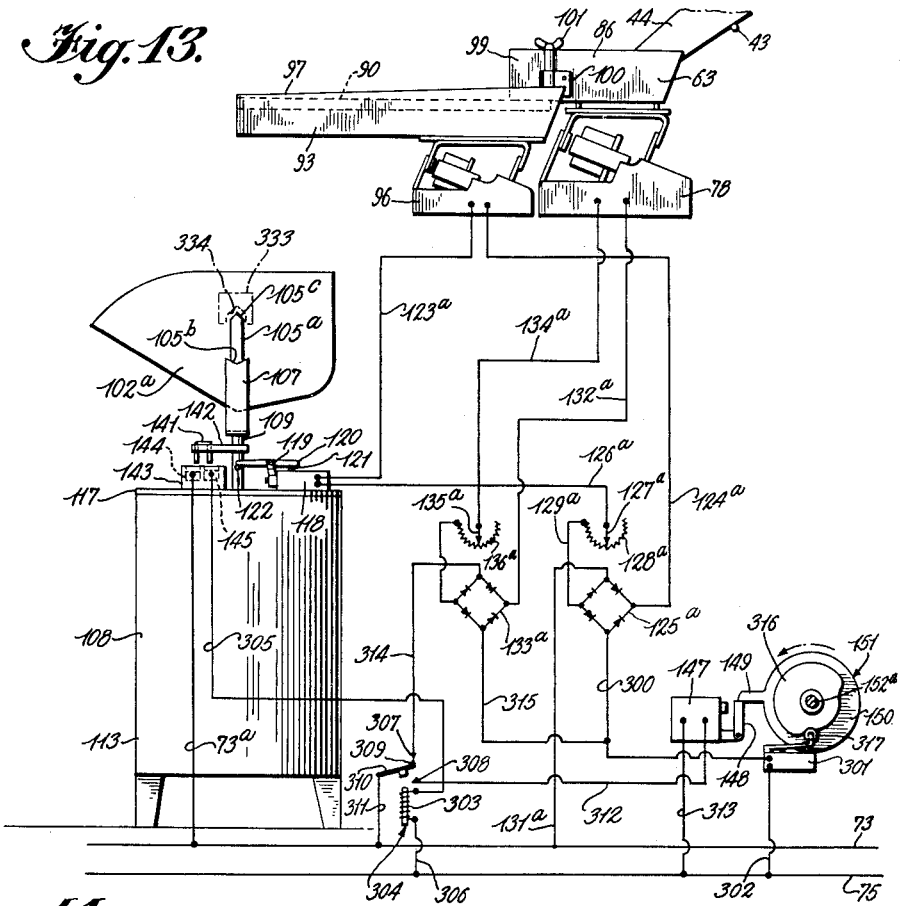
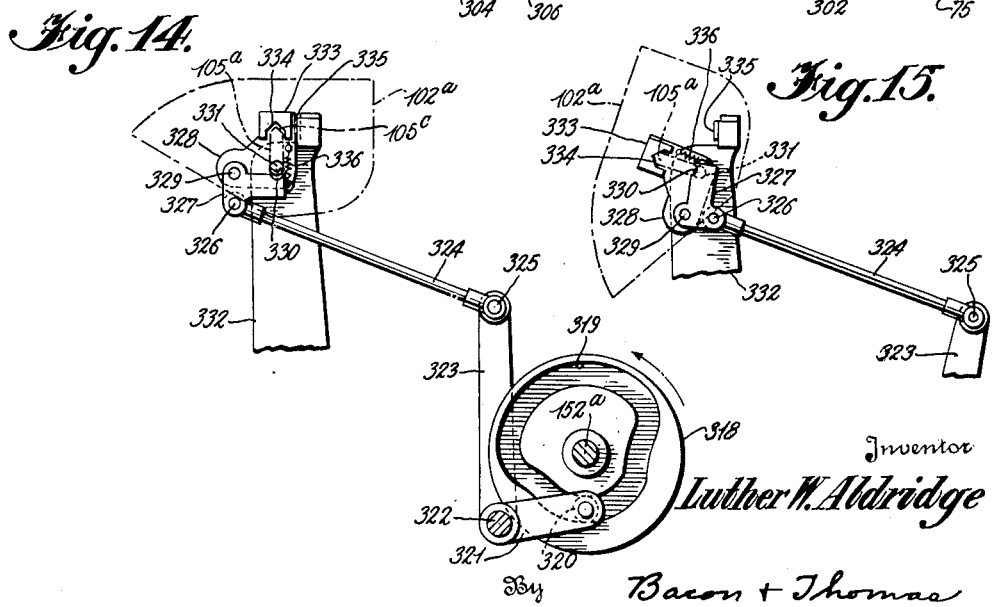

Patented Jan. 20, 1953

2,626,042

UNITED STATES PATENT OFFICE 2,626,042

AUTOMATIC WEIGHING MACHINE AND FEED CONTROL MEANS THEREFOR

Luther W. Aldridge, Durham, N. C., assignor to Wright Machinery Company, Durham, N. C., a corporation of North Carolina Application June 21, 1948, Serial No. 34,188

4 Claims. (Cl. 198—229)

The present invention relates to an automatic weighing machine and to automatic means for continuously feeding material to be weighed to said weighing machine.

More specifically, the invention relates to novel material feeding means particularly adapted to feed material to be weighed to an automatic weighing machine of the kind disclosed in the copending application of Glen M. Tracy, Serial No. 659,263. However, it is to be understood that the material feeding means disclosed herein is not necessarily limited to use with any particular kind of weighing machine.

The material feeding means comprises vibrating dribble and bulk feed conveyors having the feed troughs thereof arranged in superimposed relation, with the dribble feed trough disposed above the bulk feed trough. Both troughs are arranged to simultaneously discharge material into a receiver or weighing bucket on the weighing machine until just prior to the making of the desired weight. Means responsive to the weight of the material deposited in the receiver or bucket by both conveyors is adapted to automatically interrupt the operation of the bulk feed vibrator when the material in the bucket closely approaches the desired weight. The dribble feed vibrator, however, operates continuously and the dribble feed trough continues to discharge material into the bucket until the exact desired weight has been made whereupon two baffle plates, interposed between the weighing bucket and the discharge ends of the vibrating troughs, are automatically actuated to a position wherein they form a temporary hopper for collecting the material which continues to be fed by the dribble feed trough.

The weighing machine disclosed herein, by way of illustration and not limitation, includes a carriage which is automatically shifted, after closing of the hopper, by mechanism actuated in response to a predetermined downward movement of a movable member of the weigher caused by the making of the exact desired weight. Means is also provided to lift or elevate the loaded bucket off the weigher prior to the shifting of the carriage and such lifting enables the movable member of the weigher to return toward the position it occupied at the beginning of the weighing operation. This return movement restarts the bulk feed vibrator and it begins to feed material into the closed temporary hopper. The shifting of the carriage then quickly moves the loaded bucket to a dumping position and moves an empty bucket into loading position. The baffle plates are then returned to their initial open position and the material which has meanwhile collected in the temporary hopper is discharged into the empty receiver or bucket, and the weighing cycle is repeated. The speed of operation of the bucket elevating and carriage shifting means is so rapid that an excess of material is never fed into the temporary hopper.

The dribble feed trough is shallow, arcuate in cross-section, and gradually tapers or becomes narrower toward its discharge end, so that its cross-sectional area progressively decreases toward said discharge end, thereby assuring a continuous feed of articles in single file, or the delivery of a continuous fine stream of substantially constant volume. This feature is quite important because it makes possible very accurate weighing at high speed. The shallowness and gradual narrowing of the dribble feed trough provide a "choking" effect which causes some of the excess material introduced into the receiving end of said trough to overflow or pass over either side of the dribble feed trough and into the bulk feed trough before said excess material reaches the discharge end of said dribble feed trough. The gradual tapering or narrowing of the dribble feed trough toward its discharge end assures a continuous and uniform discharge inasmuch as the volume of material discharged is less than that which is normally introduced into the relatively wide receiving end of said trough. Hence, during normal operation, excess material deposited in the dribble feed trough will "spill over" onto the bulk feed trough to be discharged along with whatever material has otherwise been introduced into the bulk feed trough.

In the present construction, the dribble feed trough is carried by the bottom wall of a vibrating hopper and in effect forms a continuation of said hopper. The vibrating hopper is much greater in width than the receiving end of the dribble feed trough, but of only slightly less width than the bulk feed trough. The receiving end of the bulk feed trough extends to a point beneath the discharge end of the vibrating hopper and gates are adjustably mounted upon the side walls of said hopper to regulate or vary the volume of material that can be fed directly by the hopper into the bulk feed trough.

In the complete machine disclosed herein, the material to be weighed is fed by an electric motor driven endless feed belt conveyor, whose operation is automatically controlled by a feed control device interposed between the discharge end of said conveyor and the vibrating hopper, which simultaneously feeds material to the bulk and dribble troughs. The feed control device comprises an inclined, pivotally mounted chute which is operable to automatically open a normally closed switch controlling the motor which drives the feed conveyor, to thereby stop said feed conveyor whenever material in excess of a predetermined weight has been deposited in said chute and has caused the discharge end thereof to move downwardly toward the bottom wall of the vibrating hopper. This prevents too rapid feeding of material to the vibrating hopper. The feed control device is further arranged so that as the excess material is advanced by the vibrating hopper, the chute is tilted in a manner so as to raise its discharge end, so that the switch controlling the conveyor drive motor is permitted to close to start the motor and restore operation of the feed conveyor. In this manner, a continuous supply of material to the dribble and bulk feed troughs is assured, without danger of spilling and wasting the material to be weighed, and without requiring the machine operator to constantly observe and adjust feed conditions.

In another form of the machine, the dribble feed is operated intermittently, that is to say, its operation is automatically stopped or interrupted when the desired exact weight is made. In such machine, the baffle plates forming the temporary hopper and the actuating mechanism therefor are unnecessary and can be eliminated.

The principal object of the invention is to provide an automatic weighing machine that will operate rapidly and with great accuracy.

Another object of the invention is to provide an automatic weighing machine having means for automatically controlling the feeding of the material to be weighed to the receiver or bucket of the weighing machine.

Another object of the invention is to provide a relatively simple feed control device adapted to be interposed between two conveyors and which device will automatically control the operation of one conveyor so as to prevent the same from feeding an excess of material to the other conveyor.

Another object of the invention is to provide an accurate automatic weighing machine including dribble and bulk feed vibrating conveyors wherein the bulk feed is operated intermittently and the dribble feed operates continuously, and wherein the bulk feed is restarted to deposit material in a temporary hopper along with the dribble feed while a loaded bucket is being dumped, in order to effect a maximum output of the weighing machine.

Another object of the invention is to provide a simplified weighing machine in which the operation of the dribble feed is also interrupted (after the desired weight has been made), thereby making it possible to omit the temporary hopper for intercepting and collecting the dribble feed.

Another object of the invention is to provide material feeding means including a vibrating hopper arranged to simultaneously supply material to dribble and bulk feed troughs.

Still another object of the invention is to provide means for simultaneously feeding bulk and dribble feed conveyors whereby the relative volume of material fed to the bulk conveyor can be varied in accordance with differences in weighing requirements.

A further object of the invention is to provide a dribble feed trough which is so shaped and constructed that it will continuously feed articles in single file or deliver a continuous fine stream of substantially constant volume.

A still further object of the invention is to provide independently operable vibrating feed conveyors having the operating mechanism therefor arranged in tandem, so that the vibrating troughs are disposed in superimposed relation and thus occupy a minimum of space.

Other objects and advantages of the invention will be apparent from the following description taken in conjunction with the accompanying drawings, in which:

Fig. 1 is a diagrammatic view, partly in cross-section, showing the correlation of the feed conveyor, the automatic feed control chute, the vibrating dribble and bulk conveyors, the weigher, and the various circuits for the automatic control of the complete weighing machine;

Fig. 2 is a side elevational view of a portion of the feed conveyor, the feed control chute, the vibrating dribble and bulk conveyors, and the means for maintaining the feed control chute in a predetermined position so that the lower end thereof is maintained in spaced relation to the bottom of the feed hopper of the vibrating conveyors until material in excess of a predetermined weight has been deposited in said chute by said feed conveyor;

Fig. 3 is an enlarged elevational view of a portion of the other side of the feed conveyor and feed control chute, and particularly illustrating the switch which is actuated by tilting movement of the feed control chute for controlling the operation of the motor that drives the feed conveyor;

Fig. 4 is a plan view of that portion of the machine which is shown in Fig. 2, with the upper shaft of the feed conveyor shown in dot-and-dash lines;

Fig. 5 is a sectional view through the vibrating hopper, dribble feed trough and bulk feed trough, taken on the line 5—5 of Fig. 4;

Fig. 6 is an enlarged end view of the vibrating hopper, and dribble and bulk feed troughs, as viewed along the line 6—6 of Fig. 5;

Fig. 7 is a side elevational view of the mechanism employed for actuating the baffle plates to form the temporary hopper, and the mechanism for lifting a loaded bucket off the weigher;

Fig. 8 is a vertical sectional view taken on the line 8—8 of Fig. 7;

Fig. 9 is a vertical sectional view taken on the line 9—9 of Fig. 8, but illustrating the baffles in their closed, hopper-forming positions;

Fig. 10 is a fragmentary plan view of a portion of the mechanism shown in Fig. 7, but with the baffles shown in their closed position corresponding to Fig. 9;

Fig. 11 is an elevational view somewhat diagrammatically illustrating the mechanisms for effecting elevation, transfer, and dumping of the weighing buckets, but omitting in the interest of clarity, the baffle supporting and operating mechanism shown in Fig. 7;

Fig. 12 is a detail plan view illustrating the manner in which the bucket elevating bars are guided by the two pairs of cams which raise the buckets into a position to be received by the elevating bars and lowered onto the movable member or yoke of the weighing machine;

Fig. 13 is a fragmentary schematic view illustrating a modification wherein the operation of the bulk feed conveyor and the dribble feed conveyor is interrupted in succession and remain inactive while a loaded bucket is being dumped; and Figs. 14 and 15 diagrammatically illustrate mechanism for elevating and dumping the weigher bucket shown in Fig. 13.

Referring now to Fig. 1 of the drawings, the numeral 15 generally identifies a feed conveyor including an inclined, endless belt 16, the upper portion of which passes around a pulley 17 mounted upon a shaft 18, and the lower portion of which passes around a pulley 19 mounted upon a shaft 20. The shaft 20 also has a pulley 21 mounted thereon which is driven by a pulley 22 through a belt 23. The pulley 22 is mounted upon the shaft 24 of an electric motor 25. The shaft 18 has one end thereof mounted in an adjustable support 26 (Fig. 2) and the other end thereof is mounted in a similar support 27 (Fig. 3). The adjustable support 26 includes a threaded shank 28, which extends through a block 29 welded or otherwise secured to an angle iron 30 forming part of a housing 31 for the conveyor belt 16. The shank 28 is adapted to be adjusted longitudinally relative to the block 29 and to be fixed in a desired position of adjustment by nuts 32 engaging the opposite sides of said block. Similarly, the support 27 includes a threaded shank 28' extending through a block 29' welded or otherwise secured to an angle iron member 30', the shank being adjustable relative to the block 29' by nuts 32'. The shaft 20 is mounted in similar adjustable supports (not shown). Thus, the desired tension in the feed conveyor belt 16 can be maintained by suitable adjustment of the aforesaid supports.

The conveyor housing 31 may be of any conventional or suitable construction and includes a side wall 33 (Fig. 2) having a segment-shaped cheek plate 34 spot-welded thereto, as indicated at 35. The conveyor housing 31 also includes a side wall 36 (Fig. 3) having a somewhat similar cheek plate 37 spot-welded thereto, as indicated at 38. The cheek plates 34 and 37 are disposed close to the sides of the conveyor belt 16 and serve as guides for the material discharged from said belt, as will be most clear from Fig. 4.

One end of a strip 39 (Figs. 2 and 4) is secured to the angle iron 30 by bolts 40. One end of a similar strip 41 (Figs. 3 and 4) is secured to the angle iron 30' by bolts 42. The strips 39 and 41 pivotally support a shaft 43 to which a "balance plate" or feed control chute 44 is welded, brazed or otherwise fixedly secured. The chute 44 is wide enough to receive the free ends of the cheek plates 34 and 37 therein, so that said plates guide material from the feed belt 16 into said chute. The chute 44 is normally inclined downwardly and the shaft 43 is secured to the bottom wall 45 of said chute at a point adjacent the upper end thereof. One end of the shaft 43 is reduced in diameter, as indicated at 46 (Figs. 2 and 4), and one end of an arm 47 is split and secured thereto by a cap screw 48. The opposite end of the arm 47 is connected to one end of a tension spring 49 and the opposite end of said tension spring is connected to a threaded member 50 adjustably secured to a bracket 51 by nuts 52. The bracket 51 is riveted at 53 to an angle iron brace 54, which in turn is secured to the conveyor housing 31 by one or more bolts 55. The other end of the shaft 43 is also reduced, as indicated at 56 (Figs. 3 and 4), and has the split end of an arm 57 secured thereto by a cap screw 58. The upper side of the other end of the arm 57 is adapted to engage with the end of an adjustable stop 59 threadedly mounted in a lug 60 carried by the strip 41. A lock nut 61 is adapted to be jammed against the lug 60 to hold the stop 59 in any desired position of adjustment.

It will be apparent from the foregoing that the tension spring 49, acting on the shaft 43 through the arm 47, tends to raise the lower end of the chute 44, and that rotation of the shaft 43, and of the chute 44 fixedly secured to said shaft, is limited by the engagement of the arm 57 with the stop 59. Thus, the position of the lower end 44' of the chute 44 relative to the bottom wall 62 of a vibrating hopper 63, which will be described in further detail later, can be varied as desired by adjustment of the stop 59, and the weight of material required to overcome the tension of the spring 49 to effect downward tilting of the chute 44 can be varied by adjusting the tension of said spring 49.

The strip 41 (Fig. 3) has a bracket 64 secured thereto by two screws 65. The bracket 64 has a conventional, normally closed "Micro" switch 66 mounted thereon by a pair of bolts 67. The "Micro" switch 66 includes the usual operating pin or plunger 68 actuated through a spring arm 69 carrying a roller 70. The roller 70 is positioned so that it is engaged by the underside of the arm 57.

It will be apparent from the foregoing, that when the tension of the spring 49 is overcome by an excess weight of material delivered to the chute 44 by the feed conveyor 15, the lower end 44' of said chute will move downwardly into engagement with the bottom wall 62 of the hopper 63 and in so doing the arm 57 engaged with the roller 70 of the "Micro" switch 66 will cause said switch, upon the downward actuation of plunger 68, to open. One contact (not shown) of the switch 66 is connected by a wire 71 (Fig. 1) to one side of the electric motor 25 and the other side of said motor is connected by a wire 72 to a conductor 73. The other contact (not shown) of the switch 66 is connected by a wire 74 with a conductor 75. It will be obvious, therefore, that whenever the chute 44 is loaded with a weight of material in excess of that for which the spring 49 has been set, the trough 44 will tilt or pivot about the axis of the shaft 43 in a downward direction to effect opening of the switch 66 to thereby interrupt the circuit to the motor 25 and thus stop the driving of the feed belt 16. It will also be apparent that, upon removal of the excess material from the hopper 63, the spring 49 will tilt the chute 44 upwardly and raise the lower end of said chute to its normal position with the arm 57 engaging the stop 59. The latter tilting movement will remove the pressure on the roller 70 and spring arm 69, and the switch 66 will be allowed to close and restore the circuit to the motor 25, whereby to restart driving of the feed belt 16 to supply additional material to the hopper 63 through the trough 44. Thus, the supply of material to the hopper 63 is automatically controlled at all times to prevent spilling and wasting of the material to be weighed.

Referring now to Figs. 1, 2 and 5, the bottom wall 62 of the hopper 63 carries a plate 76 which is mounted upon a spring frame 77 of a conventional vibrator unit 78 including a magnetic coil 79 and an armature 80, which is attracted thereby for imparting rapid vibration to the frame 77, in a manner well understood in the art. The vibrating unit 78 is spring-mounted upon a base 81 secured to a platform 82 (Fig. 2) supported by a vertical column 83. The column 83 has an adjustable bracket 84 mounted thereon, which is welded or otherwise secured to the brace 54 and thus serves as a support for the upper portion of the conveyor housing 31.

The hopper 63 includes side walls 85 and 86 adapted to receive the lower end of the chute 44 therebetween. The side walls 85 and 86 are connected by a rear wall 87, which underlies and is spaced from the chute 44. The discharge end of the bottom wall 62 includes portions 88 which converge forwardly and terminate in a straight end portion 89, as best illustrated in Fig. 4. A dribble trough 90, which gradually tapers or becomes narrower in a direction away from the end 89 of the bottom wall 62, is welded or otherwise suitably secured to the underside of said bottom wall. The dribble trough 90 is shallow and arcuate in transverse cross-section, as is best shown in Fig. 6, and the area within the trough progressively decreases toward its discharge end. The extremity 89 of the bottom wall 62 carries a flange 92 extending downwardly into the dribble trough 90 for preventing material discharged from said bottom wall into said dribble trough from working its way back under said bottom wall.

A bulk feed conveyor including a trough 93 is disposed below the dribble feed trough 90 and extends part way under the bottom wall 62 of the hopper 63. The bulk feed trough 93 has a bottom wall 94 which is mounted upon a spring frame 95 of a conventional vibrator unit 96 similar to the unit 78. The vibrator unit 96 is also spring-supported upon the base 81 and the vibrators 78 and 96 are arranged in tandem. The bulk feed trough 93 includes side walls 97 which are disposed outwardly of the hopper side walls 85 and 86. A rear wall 98 of less height than the side walls 97 interconnects said side walls.

The discharge end 88—89—88 of the bottom wall 62 of the vibrating hopper 63 overlies the bottom wall 94 of the bulk feed trough 93, so that when the hopper 63 is rapidly vibrated, material is simultaneously fed over the end of said bottom wall 62 into the dribble feed trough 90 and into the bulk feed trough 93. The dribble feed trough is arranged centrally of the bulk feed trough 93 and forms, in effect, a continuation of the vibrating hopper 63. The relative amount of material fed to the bulk feed trough 93 can be regulated by the adjustment of a pair of gates 99, one of which is carried by each of the hopper side walls 85 and 86. A bracket 100 is secured to each of the hopper side walls 85 and 86 and a wing bolt 101 is threaded into each of said brackets and is arranged to clamp the gates 99 in any desired angular position relative to the hopper side walls 85 and 86.

When the vibrator units 78 and 96 are in operation, the material to be weighed is simultaneously moved toward the discharge ends of the dribble and bulk feed troughs 90 and 93, respectively, and discharged into a receiver or weighing bucket 102. Inasmuch as the dribble feed trough 90 becomes narrower toward its discharge end, the excess material conveyed thereby is forced over either side thereof by the "choking" action of the trough and flows into the bulk feed trough, as indicated by the arrows in Fig. 4, so that eventually a single-file article feed or a very fine stream is discharged from the dribble trough. The material thus added to the bulk feed trough 93 is fed along with the material previously introduced thereinto by the vibrating hopper 63.

The bulk and dribble troughs 93 and 90 feed a weigher including the weighing bucket 102 (Figs. 1 and 11), which is mounted upon a carriage 103 in side-by-side relation to a similar bucket 104. Each of the buckets 102 and 104 is provided with trunnions 105 at the opposite ends thereof, and these trunnions are received in open slots 106 formed in the sides of the carriage 103. The bucket 102 is illustrated in full lines in its loading position in Fig. 1, with the trunnions 105 thereof supported upon the ends of a yoke 107, and the bucket 104 is shown in a position to which it has been moved by the carriage 103 to effect dumping thereof. The bucket 102 is represented in its dumping position by dot-and-dash lines. The carriage 103 is adapted to be automatically reciprocated to empty a loaded bucket and to place an empty bucket in loading position, by a carriage shifting mechanism which will be briefly described hereinafter. This carriage shifting and dumping mechanism is disclosed in more complete detail in the copending application of Tracy, Serial No. 659,263, supra.

The yoke 107 is part of a buoyant or liquid displacement type of weighing mechanism 108, which is diagrammatically illustrated in cross-section in Fig. 1. The yoke 107 is mounted upon the upper end of a rod 109, which has a cross bar 110 secured to the lower end thereof. The rod 109 is guided for vertical movement by rollers 111 mounted upon a bracket 112 disposed within a container 113. The container 113 is partially filled with oil or other suitable liquid 114, and a pair of hollow floats 115 is buoyantly supported by the liquid 114, the lower ends of said floats being pivotally connected to the outer ends of the cross bar 110. Stop pins 116 are mounted upon the bracket 112 and maintain the floats 115 submerged in the liquid 114 to a predetermined depth such that the floats 115 displace a volume of the liquid 114 equal to the weight of the material to be weighed in one of the buckets 102 and 104, plus such additional volume of liquid as is necessary to compensate for the dead weight of the empty bucket, rod 109, yoke 107, etc. Thus, the floats 115 are preloaded and will not begin to move downwardly in the liquid 114 until a predetermined weight of material has been deposited in the weighing bucket supported by the yoke 107. If the desired weight to be made is one pound, for example, then the liquid level is adjusted so that the rod 109 does not begin to move downwardly until the material deposited in the bucket being loaded is within an ounce or two of said desired weight.

The container 113 has a cover 117 upon which a normally open "Micro" switch 118 is mounted. A bracket 119 is mounted upon the "Micro" switch 118 and pivotally supports a lever 120. One end of the lever 120 engages the usual operating pin 121 of the "Micro" switch 118, and the other end of said lever is adapted to be engaged by a pin 122 carried by the rod 109. The pin 122 is normally held in engagement with the lever 120 by the buoyant effect of the liquid 114 upon the floats 115, so long as there is less than a predetermined weight of material in the weighing bucket supported by the yoke 107. However, when the weight of the material in the bucket being loaded closely approaches the desired maximum, i. e., is within an ounce or two of the desired weight, the buoyant effect of the liquid on the floats 115 is overcome and the loaded bucket, yoke 107, and rod 109 start to move downwardly displacing some of the liquid 114 and thereby relieving the pressure of the pin 122 on the lever 120 and permitting the switch 118 to open and discontinue operation of the bulk feed conveyor 93, as will now be explained. The rheostats 128, 136 can vary the speed of vibrators 78, 96.

One contact (not shown) of the switch 118 is connected by a wire 123 to one side of the bulk vibrator unit 96 and the other side of said unit is connected by a wire 124 to one contact of a conventional rectifier 125. The other contact (not shown) of the switch 113 is connected by a wire 126 to the arm 127 of a conventional rheostat 128. The rheostat 128 is connected by a wire 129 to another contact of the rectifier 125, and the rectifier 125 is connected with the conductors 73 and 75, respectively, by wires 130 and 131. Accordingly, when the switch 113 is permitted to open, the circuit to the bulk vibrator 96 will be interrupted and the feed of material by the bulk feed conveyor 93 will be discontinued. The operation of the dribble feed vibrator 78, however, is not interrupted and it continues to feed material to the nearly fully loaded bucket on the weigher 108, displacing more liquid 114 until the exact desired weight has been made. In this connection, it will be noted that one side of the dribble feed vibrator 78 is connected by a wire 132 to one side of a conventional rectifier 133 and that the other side of said vibrator is connected by a wire 134 with the arm 135 of a conventional rheostat 136. The rheostat 136 is connected by a wire 137 with another contact of the rectifier 133 and wires 138 and 139 connect the rectifier 133 with the conductors 73 and 75, respectively. The supply of current to the conductors 73 and 75 is controlled by a manually operable main switch 140.

The material deposited in the bucket 102 by the dribble feed conveyor trough 99, after the operation of the bulk feed trough 93 has been discontinued, to complete the desired weight, necessarily produces a slight further downward movement of the yoke 107 and rod 109. Such further movement is utilized to operate a second switch comprising a U-shaped conductor 141 (Fig. 1) carried by an insulating block 142 mounted upon the rod 109, and an insulating block 143 mounted upon the cover 117 and containing two mercury pools 144 and 145 adapted to be engaged by the legs of the U-shaped conductor 141 as the rod 109 is moved downwardly to thus electrically interconnect said mercury pools. The mercury pool 144 is connected by a wire 146 to one side of a solenoid 147 and the mercury pool 145 is connected with the conductor 73. The other side of the solenoid 147 is connected with the conductor 75 to complete the circuit. An armature 148 has one end thereof pivotally mounted upon the housing of the solenoid 147 and its other end is adapted to lie in the path of an arm 149 carried by the driven element 150 of a one-revolution, slip-type friction clutch 151. The clutch element 150 is mounted upon a shaft 152 and is frictionally engaged by a continuously rotating driving clutch element 153. The driving element 153 is secured to a shaft 154 having a gear 155 secured thereto and continuously driven by a gear 156, which derives its rotation from a motor 156ᵃ. The motor 156ᵃ operates continuously and is connected by wires 156ᵇ and 156ᶜ with the conductors 73 and 75, respectively. The clutch 151 slips when the part 150 is held stationary by the armature 148.

The shaft 152 serves as a source of power for driving mechanism for elevating a loaded bucket from the weigher 108 and for effecting shifting of the carriage 103, as will be described later, and also as a drive for effecting operation of baffle plates 157 and 157ᵃ adapted to be actuated from the open position shown in full lines in Figs. 1 and 2, to a closed position shown by the dot-and-dash lines in Fig. 2, to form a temporary hopper 158 adapted to catch the material which continues to be fed by the dribble feed trough 99 while the loaded bucket 102 is being transferred to the dumping position indicated by dot-and-dash lines in Fig. 1 and the empty bucket 104 is being righted and returned to its loading position. Thus, when the electromagnet 147 is energized by the closing of the switch 141, 144, 145 its armature 148 is moved out of the path of the arm 149, thereby releasing the driven element 150 of the one-revolution clutch 151 and permitting the shaft 152 to be turned through one revolution. Upon raising of the loaded bucket 102 from the weigher yoke 107, as will be explained later, the floats 115, being relieved of the weight of the loaded bucket, move the rod 109 upwardly, thereby raising the U-shaped contact member 141 out of the mercury pools 144 and 145 to effect deenergization of the solenoid 147, whereupon the armature 148 again assumes a position in the path of the arm 149 and interrupts the rotation of the driven clutch element 150 after it has made one revolution. The raising of the rod 109 also brings the pin 122 into contact with the lever 120 so that said lever is caused to pivot and actuate the switch 113 to its closed position, thereby restoring the circuit to the bulk vibrator 96 to restart the feeding of material by the bulk feed trough 93 while the baffle plates 157 and 157ᵃ are still in closed position. After the empty bucket has been positioned on the weigher yoke 107, the baffle plates 157 and 157ᵃ are reactuated to return them to their open positions to discharge material from the temporary hopper momentarily formed thereby into the empty bucket.

The details of construction of the baffle plates 157 and 157ᵃ and the mechanism for actuating the same are best illustrated in Figs. 7 to 10, inclusive, to which reference now may be had.

The baffle plate 157 is secured to a flat portion of a shaft 159 by rivets 160 and the baffle plate 157ᵃ is similarly secured to a flat portion of a shaft 161 by rivets 162. The baffle plate 157 has side extensions 163, which are cooperable with similar side extensions 164 on the baffle plate 157ᵃ to provide the temporary hopper 158 when the baffle plates are actuated to their closed position. The side extensions 164 are adapted to be disposed between the side extensions 163, whereby to form side walls for the hopper 158, the baffle plates 157 and 157ᵃ themselves being adapted to form the bottom of said hopper. A strip of rubber or other suitable flexible material 165 is carried by and forms an extension of the baffle plate 157 and a similar strip 166 is carried by and forms an extension of the baffle plate 157ᵃ. An arm 167 is secured by rivets 168 to each of the side extensions 163 of the baffle plate 157 and in turn is secured by a pin 169 to the shaft 159. Similar arms 170 are secured by rivets 171 to the side extensions 164 of the baffle plate 157ᵃ and are secured by pins 172 to the shaft 161.

The shaft 159 is rotatably supported in brackets 173 secured to rails 174 by cap screws 175. The shaft 161 is similarly supported in brackets 176 secured to the rails 174 by cap screws 177. The rails 174 are secured to the upper ends of brackets 178 by cap screws 179 and the lower ends of said brackets are secured to side plates 180 by cap screws 181. One of the brackets 178 has one end of a pair of studs 182 secured thereto by nuts 183. A roller 184 is mounted upon the opposite end of each of said studs and is retained thereon by a cotter pin 185 extending through said studs.

Each of the rollers 184 is provided with a groove 186 to enable the same to serve as a guide for the lower end 187 of a vertically reciprocable yoke 188. The upper portion 189 of the yoke 188 resembles an inverted triangle and a gear rack 190 is secured by cap screws 191 to the inner side of the yoke 188 at the opposite ends of the base or uppermost portion of said triangle. The teeth of each of the gear racks 190 mesh with the teeth of gears 192. The gears 192 are disposed between discs 193 and 193a on either side thereof, said discs and each gear being secured together by screws 193b, and each disc 193a being secured to its respective shaft 159 and 161 by a pin 193c. The teeth of the gear racks 190 thus ride between the discs 193 and 193a, and said discs thus serve as guides for the upper end of the yoke 188.

The lower yoke end 187 carries a roller 194 (Figs. 7 and 8), which rides in a groove 195 formed in a baffle-operating face cam 196 secured to a shaft 197. The shaft 197 is intermittently driven through a single revolution from the shaft 152 (Fig. 1) by suitable intermediate mechanism (not shown), and one end of the shaft 197 is journalled in a bushing 198 mounted in one of the side plates 180. It will be apparent from the shape of the cam groove 195 (Fig. 7) that, as the cam 196 is rotated, it will effect up and down movement of the yoke 188. It will also be apparent that, as the yoke 188 is raised, the gear racks 190 acting through the gears 192 will effect rotation of the shafts 159 and 161 through an angle such that the baffle plates 157 and 157a will assume the position illustrated in Fig. 9, with the flexible portions 165 and 166 thereof in engagement. The flexible strips 165 and 166 thereof in engagement. The flexible strips 165 and 166 prevent damage to the baffle plates 157 and 157a, which might otherwise occur when a hard object is caught therebetween in mid-air, during closing movement of said plates. The timing is such that the first forty degrees of rotation after tripping of the one-revolution clutch 151 effects closing of the baffle plates 157 and 157a. When the baffle plates 157 and 157a are in their closed or raised position they form the bottom walls of the hopper 158 which receives the material that continues to be fed, after the desired weight has been made, by the dribble feed conveyor trough 90. Of course, as the yoke 188 is lowered by the cam 196, the baffle plates 157 and 157a will be restored to their open position shown in Fig. 7 and the material accumulated in said hopper drops into the empty bucket 102.

One end of a tension spring 199 is connected by a cotter pin 200 with an intermediate portion of the yoke 188, and the opposite end of said spring is connected to the upper end of a stud 201 which has its lower end threaded into one of the side rails 174 and locked against rotation by a jam nut 202. The action of the tension spring 199 tends to raise the yoke 188 as permitted by the shape of the cam groove 195 and relieves the cam 196 of the weight of said yoke. It will be observed that Fig. 7 shows the cam 196 in a position wherein the baffle plates 157 and 157a are almost in their fully open position. It will also be observed that the cam groove 195 includes a concentric portion 203 of substantial arcuate length adapted to maintain the baffle plates 157 and 157a in their closed position for a considerable portion of the time that the shaft 197 is making a single revolution. It is while the baffles 157 and 157a are in their closed position that shifting of the carriage 103 is effected by mechanism which will now be described.

Referring to Figs. 8 and 11, the carriage 103 is provided with rollers 204, which ride in grooves 204a formed in the inner faces of the rails 174. The rails 174 are each provided with an elongated slot 205 (Fig. 11) and studs 206 secured to opposite sides of the carriage 103 extend through said slots. An arm 207 at each side of the machine has a slot 208 at the upper end thereof in which the stud 206 is received. The arms 207 are secured to a shaft 209 which extends across the machine and is carried by brackets 210. One end of a lever 210a is secured to one end of the shaft 209 and the opposite end of said lever is connected to one end of a link 211 by a pin 211a. The opposite end of the link 211 is connected by a pin 211b to a crank 212 mounted upon a shaft 213. The shaft 213 is driven from the one-revolution shaft 152 by intermediate mechanism (not shown) designed so that the shaft 213 is rotated only one-half of a revolution for each full revolution of the shaft 152. Hence, as the shaft 213 is rotated through a half revolution, the crank 212 will cause the upper end of the arms 207 to be moved from the position adjacent one end of the slot 205 to a position adjacent the other end of said slot, thereby moving or shifting the carriage 103 a distance sufficient to transfer the bucket 104 from its loading position shown in Fig. 11 to its dumping position shown in Fig. 1. The timing and design of the aforedescribed carriage shifting mechanism is such that the shaft 213 rotates intermittently and in timed relation to the baffle plate operating shaft 197.

As the loaded bucket 104 is moved toward the left, as viewed in Fig. 11, a pin 214 carried by said bucket engages guide rails 215 for automatically tilting the bucket 104 to dumping position while the carriage 103 is still in motion. The movement of the carriage 103 to transfer the loaded bucket 104 to dumping position simultaneously moves the empty bucket 102 into loading position. Rails 216 similar to the rails 215 cooperate with a pin 217 carried by the bucket 102 for effecting righting of said bucket as it is moved by the carriage 103 from its dumping position to its load-receiving position.

Stationary, spaced cams 218 are carried by each of the rails 174 and have inclined upper surfaces 218a arranged to be engaged by the trunnions 105 of the buckets 102 and 104 to effect elevation of said trunnions to a position above the upper ends of the weigher yoke 107 as the buckets are successively moved into loading position. It will be understood, of course, that during a weighing operation, the trunnions 105 of one bucket are disposed between the adjacent ends of the cams 218 and the weight of the bucket is supported solely by the yoke 107 and not by the carriage 103. The vertical movement of the trunnions 105 relative to the carriage 103, as either of the buckets 102 and 104 is elevated by the cams 218, is permitted by the open vertical slots 106, previously referred to, formed in the side walls of said carriage.

It is, of course, necessary to lift the loaded bucket off the weigher yoke 107 before the carriage 103 can be transferred, and such lifting is accomplished by means of an elevating cam 219 (Figs. 8 and 11), mounted upon the shaft 197 adjacent the cam 196. A roller 220 engages the periphery of the cam 219 and is secured to the lower end of a vertically movable bar 221. The lower end of the bar 221 is slidably received in a groove 222 formed in the side plate 180. One end of an arm 223 is pivotally connected by a pin 224 with the bar 221 and the opposite end of said arm is fixed to one end of a shaft 225. The shaft 225 extends transversely between the side plates 180 and one end of an arm 226 (Fig. 8) is secured to the opposite end of said shaft, as indicated by the dot-and-dash lines. The opposite end of the arm 226 is pivotally connected by a pin 227 to the lower end of a second vertically movable bar 228 which rides in a groove 222a formed in the adjacent side plate 180. The bars 221 and 228 are aligned with the yoke 107 and are slidably mounted in grooves 229 formed in the brackets 178. The bars 221 and 228 include offset ends 230, which are located between the vertical arms of the yoke 107 and the side walls of the carriage 103. The upper ends of the elevating bars 221 and 228 are guided for vertical movement by the reception of the offset ends 230 thereof in grooves 231 (see Figs. 11 and 12) formed in the adjacent faces of the stationary cams 218.

The upper ends of the elevating bars 221 and 228 are positioned directly below the trunnions 105 of the weighing bucket being loaded and, when retracted, are spaced from said trunnions a greater distance than that through which the yoke 107 moves downwardly during the loading of the bucket and the making of the desired weight. Hence, the bars 221 and 228 do not in any way interfere with the weighing operation. The elevating bars 221 and 228 are retracted as permitted by the cam 219 and maintained in their retracted position by a tension spring 232, one end of which spring is connected to a pin 233 on the arm 223 and the other end of which is connected to a pin 234 mounted on one of the side plates 180.

In the operation of the machine, and as previously described, after the desired exact weight has been made, the circuit to the solenoid 147 is closed by the mercury switch 141—144—145 and said solenoid is energized to release the driven element 150 of the one-revolution clutch 151, whereupon the shaft 152 effects a single turn rotation of the shaft 197 (through intermediate mechanism, not shown); and while the cam 196 is actuating the yoke 188 and the baffle plates 157 and 157a to their closed position, the cam 219 is simultaneously effecting raising of the elevating bars 221 and 228 to lift the loaded bucket off the yoke 107 to an elevation above the highest portion of the stationary cam surfaces 218a. The crank 212 is simultaneously actuated by means also driven by the shaft 152 associated with the one-revolution clutch, as previously stated, to effect shifting of the carriage 103 to effect dumping of the loaded bucket and to position the trunnions 105 of an empty bucket in alignment with the bars 221 and 228 and the yoke 107.

It will be understood that the stationary cams 218 are engaged by the trunnions 105 of the loaded bucket and as the carriage 103 moves said bucket down one pair of the inclined cam surfaces 218a, the loaded bucket is lowered in the carriage slots 106. On the other hand, as the carriage 103 moves the empty bucket toward loading position, its trunnions ride up the other pair of inclined cam surfaces 218a to effect elevation of the trunnions of said empty bucket to a position above the ends of the elevating bars 221 and 228. After the trunnions 105 have been positioned upon the upper ends of the elevating bars 221 and 228, the further rotation of the cam 219 allows the spring 232 to retract said bars to thereby gently lower the trunnions into engagement with the upper ends of the yoke 107 so that the weight of the bucket is transferred to said yoke without jarring. Rotation of the cam 196, meanwhile, actuates the yoke 188 to move the baffle plates 157 and 157a to open position, thereby allowing the material deposited in the hopper 158, while the bucket elevating and shifting operations were occurring, to drop into the empty weighing bucket.

The operation of the present machine has been variously described in connection with the operation of the component parts thereof, and it is, therefore, believed unnecessary to include a complete resume of the entire operation of the machine inasmuch as it would be superfluous.

It will be apparent from the foregoing that the weighing mechanism, the bulk and dribble feed vibrators and the feed control chute are all so correlated as to automatically provide for successive, accurate and rapid weighing operations. It will also be understood that the weighed material discharged successively from the respective loaded weighing buckets is preferably deposited in a chute (not shown) arranged so as to effect filling of successive receptacles.

Figs. 13 to 15 diagrammatically illustrate a modified form of automatic weighing machine in which the operation of the dribble feed trough 90 is intermittent instead of continuous, and wherein the temporary hopper-forming baffles 157 and 157a are omitted; and the carriage 103 with its two buckets 102 and 104 are replaced by a single bucket and operating mechanism for automatically elevating and dumping the same after the desired exact weight of material has been deposited therein.

In Fig. 13, the parts corresponding to those already described are identified by the same reference numerals and the description thereof will not be repeated. However, the bulk feed control switch 118 and the mercury switch 141—144—145 controlling the one-revolution clutch 151 are connected in circuits differing from those previously described, and these will be fully discussed hereinafter. The single bucket of the modified machine is identified by the numeral 102a and is adapted to cause the weigher yoke 107 and rod 109 to move downwardly in the same manner as the buckets 102 and 104 during the weight-making portion of the cycle. The bucket 102a has an elongated, upright trunnion 105a at each end thereof. The lower end of each of the trunnions 105a is rounded at 105b and rests upon the upper end of one of the arms of the yoke 107, and the upper end of each trunnion 105a has a wedge-shaped point 105c provided for a purpose which will be explained later. The mechanism for elevating the bucket 102a after the full weight has been made, and for thereafter dumping said bucket is diagrammatically shown in Figs. 14 and 15.

One side of the normally open bulk feed control switch 118 is connected with one side of the bulk feed vibrator 96 by a wire 123a and the other side of said vibrator is connected by a wire 124a with one contact of a conventional rectifier 125a; and the other side of the switch 118 is connected by a wire 126a with the arm 127a of a conventional rheostat 128a, one end of the coil of said rheostat being connected by a wire 129a to another contact of the rectifier 125a, all in a manner similar to that shown in Fig. 1. Another contact of the rectifier 125ᵃ is connected by a wire 131ᵃ with the conductor 73, also as in Fig. 1; but the remaining contact is connected by a wire 300 with one contact (not shown) of a normally closed "Micro" switch 301. The other contact (not shown) of the switch 301 is connected by a wire 302 to the other conductor 75. Thus, it will be apparent that switches 118 and 301 must both be closed in order to supply current to the bulk vibrator unit 96, and that the operation of the bulk feed conveyor 93 is interrupted by opening of the switch 118 as the weight of material in the bucket 102ᵃ closely approaches the desired weight and causes the rod 109 to move downwardly.

One pool 144 of the mercury switch is connected by a wire 73ᵃ with the conductor 73. The other pool 145, however, is connected with one end of a coil 303 of a conventional relay 304 by a wire 305, and the other end of the relay coil 303 is connected by a wire 306 with the other conductor 75. The relay 304 has two fixed contacts 307 and 308, and a movable contact 309, on one end of an armature 310, which is adapted to engage one or the other of said two fixed contacts. The armature 310 is connected by a wire 311 with the conductor 73. The fixed relay contact 308 is connected by a wire 312 to one end of the coil of the electromagnet 147, which controls the one-revolution clutch 151, and the other side of said coil is connected by a wire 313 with the conductor 75. The other fixed relay contact 307 is connected by a wire 314 to one contact of a conventional rectifier 133ᵃ. The opposite contact of the rectifier 133ᵃ is connected by a wire 315 to the wire 300. One side of the dribble feed vibrator 78 is connected by a wire 132ᵃ to a third contact of the rectifier 133ᵃ, and the other side of said vibrator is connected by a wire 134ᵃ to the arm 135ᵃ of a conventional rheostat 136ᵃ. Thus, the dribble feed vibrator 78 will remain in operation even after the circuit to the bulk feed vibrator 96 has been interrupted by opening of the switch 121, as aforedescribed, provided that the relay 304 is deenergized and the switch 301 is closed. However, when the dribble feed conveyor 90 has fed sufficient material to the bucket 102ᵃ to make the desired exact weight, the further downward movement of the rod 109 of the weigher 108 incident thereto will cause the U-shaped contact 141 to engage the mercury pools 144 and 145 and complete the circuit to the relay coil 303, thereby energizing said coil and causing attraction of the armature 310 to the core of said coil and moving the contact 309 out of engagement with the contact 307, thus interrupting the circuit to the dribble feed vibrator 78, whereupon the operation of the dribble feed conveyor 90 ceases.

Actuation of the armature 310, as above described, moves the contact 309 carried thereby into engagement with the contact 308 so that substantially simultaneously with the interruption of the circuit to the dribble feed vibrator 78, the electromagnet 147 is energized to pull the armature 148 thereof out of the path of the arm 149 of the driven element 150 of the one-revolution clutch 151. A shaft 152ᵃ is connected with the driven clutch element 150 and carries a cam 316 whose periphery is adapted to engage with a roller 317 on the operating arm of the normally closed switch 301. The cam 316 is designed so that it effects opening of the switch 301 during the first few degrees of revolution thereof following the tripping of the one-revolution clutch 151. The opening of the switch 301 precludes the flow of current to the rectifiers 125ᵃ and 133ᵃ so that the bulk and dribble feed vibrators 96 and 78, respectively, are forced to remain inactive, even after the bulk feed control switch 118 has been allowed to close and the opening of the mercury switch 141—144—145 has deenergized the relay 304 and also deenergized the electromagnet 147, as an incident to the upward movement of the rod 109 during the lifting of the loaded bucket from the yoke 107, all as will appear more fully hereinafter.

The mechanism for lifting the loaded bucket 102ᵃ from the yoke 107 and for effecting dumping of said bucket and the return thereof to said yoke includes a face cam 318 mounted upon the shaft 152ᵃ (Fig. 14) and provided with a groove 319. A roller 320 is received in the cam groove 319 and is rotatably mounted upon one end of an arm 321, the other end of said arm being secured to a shaft 322 rockably supported in bearings, not shown. The shaft 322 has a pair of arms 323 secured thereto, only one of which is shown in the drawings, it being understood that one arm 323 and the mechanism associated therewith is duplicated at each end of the bucket 102ᵃ. One end of a link 324 is pivotally connected by a pin 325 with the arm 323, and the opposite end of said link is pivotally connected by a pin 326 to a lifting finger 327. The lifting finger 327 is pivotally mounted at one end thereof upon an arm 328 by a pin 329 normally disposed above the pin 326. The other or free end of the lifting finger 327 has the upper surface thereof provided with a semicircular notch 330 adapted to engage with the rounded end 105ᵇ of one of the trunnions 105ᵃ. The arm 328 is pivotally mounted by a pin 331 upon the upper end of a bracket 332. A block 333 is carried by the arm 328 and has a recess 334 generally complemental to the wedge-pointed end 105ᶜ of the trunnion 105ᵃ. One of the trunnions 105ᵃ and the bucket 102ᵃ are shown in dot-and-dash lines in Fig. 14, in the position they assume during a weighing operation, the lifting finger 327 being shown retracted and clear of its associated trunnion 105ᵃ. The bracket 332 carries a pad 335 adapted to be engaged by one side of the arm 328 when the lifting finger 327 is in its retracted position. A tension spring 336 has one end thereof connected with the free end of the lifting finger 327 and its other end connected with the arm 328 and continuously tending to pull said lifting finger toward the block 333.

It will be understood that when the bucket 102ᵃ is supported upon the weigher yoke 107, as shown in Fig. 13, each of the trunnions 105ᵃ assumes the floating position shown in dot-and-dash lines in Fig. 14, between a lifting finger 327 and a block 333. Upon tripping of the one-revolution clutch 151, after making the exact weight as aforedescribed, the shaft 152ᵃ is driven through one revolution and the cam 318 is rotated, whereupon the cam groove 319 acting on the roller 320 causes the arm 321 to rock the shaft 322, with the result that the upper end of the arm 323 is moved toward the right, as viewed in Fig. 14, thereby causing the parts to assume the position shown in Fig. 15 to effect raising of the bucket 102ᵃ from the yoke 107 and dumping of the weighed material from said bucket. Thus, it will be apparent that as the arm 323 is turned in a clockwise direction, the link 324 will cause the lifting finger 327 to rotate counter-clockwise about its pivot pin 329 and engage the notch 330 with the rounded end 105ᵇ of the trunnion 105ᵃ, raising the loaded bucket 102ᵃ and forcing the pointed end 105ᶜ of said trunnion into engagement with the inverted V-shaped portion of the recess 334, the sloping walls of which portion cause the trunnion 105ᵃ to center itself in the block 333. While the foregoing is occurring, the bucket 102ᵃ is, of course, being lifted off the yoke 107 so that the rod 109 is permitted to rise and successively open the switch 141—144—145 to deenergize the relay 304 controlling the circuit to the dribble feed vibrator 78 and closing the bulk feed vibrator control switch 118. However, the cam 316 is now acting on the roller 317 of the switch 301 and maintaining the circuits to the vibrator units 78 and 96 open, so that no material can be fed thereby at this time. Eventually, each trunnion 105ᵃ is clamped between a block 333 and a lifting finger 327 through the tension of the springs 336, and the arms 328 are turned about their pivots 331 to move the bucket 102ᵃ to its dumping position indicated by dot-and-dash lines in Fig. 15. Thereafter, the direction of travel of the arm 323 is reversed by the cam 318 and the empty bucket 102ᵃ is righted and its trunnions 105ᵃ returned into engagement with the upper ends of the arms of the yoke 107. After the bucket is thus returned, the cam 316 allows the switch 301 to close and the circuits to the bulk and dribble feed vibrators are restored and they simultaneously start to feed material into the empty bucket 102ᵃ to start a new weighing cycle. The cam 318 comes to rest with the lifting fingers 327 fully retracted against the tension of the springs 336, so as not to interfere with the downward movement of the bucket 102ᵃ as the material to be weighed is fed thereto by the bulk and dribble feed conveyors 93 and 90, respectively. The cam 316, of course, comes to rest in a position permitting the switch 301 to remain closed until the one-revolution clutch 151 is again tripped.

The automatic weighing machine shown in Figs. 13 to 15 is, of course, adapted to be fed by a feed conveyor such as shown in Fig. 1 and, in fact, the automatic feed control chute 44 has been shown in Fig. 13 for supplying material to the hopper 63.

It will be understood that various changes may be made in the arrangement and details of the various mechanisms and circuits disclosed herein, without departing from the spirit of the invention or the scope of the annexed claims.

I claim:
1. A feeding device for weighing machines, comprising: a trough-shaped bulk feed conveyor; and a dribble feed conveyor, said dribble feed conveyor being disposed above said bulk feed conveyor to overlie the same and being of less width and capacity than said bulk feed conveyor and converging in lateral dimension and capacity toward its discharge end, the lateral edges of said dribble feed conveyor being substantially inward of corresponding edges of said bulk feed conveyor whereby excess material being conveyed by said dribble feed conveyor can overflow onto said bulk feed conveyor before it reaches the discharge end of said dribble feed conveyor and separate means for actuating each of said conveyors independently of the other.

2. A feeding device for weighing machines, comprising: a bulk feed trough; separate means for vibrating said bulk feed trough; a dribble feed trough; and means for vibrating said dribble feed trough, said dribble feed trough being disposed above and overlying said bulk feed trough and being relatively shallow and of less width than and within the lateral boundaries thereof, said bulk feed trough and also converging in dimension and capacity toward its discharge end so that excess material in said dribble feed trough can feed over the sides thereof onto said bulk feed trough before it reaches the discharge end of said dribble feed trough and means for simultaneously feeding material to both said troughs.

3. A feeding device for weighing machines, comprising: a first vibrator unit; a bulk feed trough of relatively large capacity mounted upon said first vibrator unit; a second vibrator unit disposed in tandem relation to said first vibrator unit, a hopper mounted upon said second vibrator unit, said hopper including a bottom wall and side walls; a dribble feed trough of relatively small capacity carried by said bottom wall of said hopper, said dribble feed trough being of less width than said hopper and forming a continuation of said hopper substantially centrally overlying said bulk feed trough, said dribble feed trough and at least the adjacent end of said bottom wall overlying said bulk feed trough in vertically spaced relation thereto, whereby said hopper is adapted to simultaneously feed material to said dribble and bulk feed troughs, said dribble feed trough having its discharge end in position to discharge material beyond but adjacent the discharge end of said bulk feed trough.

4. A feeding device as defined in claim 3 wherein said dribble feed trough is arranged to substantially centrally overlie said bulk feed trough with its discharge end and receiving end vertically spaced above corresponding portions of said bulk feed trough, said hopper being at the receiving ends of said troughs and arranged to deliver a stream of material downwardly whereby part of said stream enters said dribble feed trough and the rest of said stream drops therepast into said bulk feed trough.

LUTHER W. ALDRIDGE.

REFERENCES CITED

The following references are of record in the file of this patent:

UNITED STATES PATENTS

| Number | Name | Date |
|---|---|---|
| 1,120,299 | Fleming | Dec. 8, 1914 |
| 1,170,077 | Lawry | Feb. 1, 1916 |
| 1,259,524 | Kelly | Mar. 19, 1918 |
| 1,322,469 | Ross | Nov. 18, 1919 |
| 2,071,443 | Weckerly | Feb. 23, 1937 |
| 2,101,561 | Rapp | Dec. 7, 1937 |
| 2,139,903 | Mason et al. | Dec. 13, 1938 |
| 2,258,182 | Howard | Oct. 7, 1941 |
| 2,266,906 | Rapp | Dec. 23, 1941 |
| 2,270,083 | Rapp | Jan. 13, 1942 |
| 2,332,600 | Rapp | Oct. 26, 1943 |
| 2,333,338 | Rapp | Nov. 2, 1943 |
| 2,333,435 | Muskat | Nov. 2, 1943 |
| 2,334,368 | Wolf | Nov. 16, 1943 |
| 2,342,116 | Broekhuysen | Feb. 22, 1944 |
| 2,352,114 | Muskat | June 20, 1944 |
| 2,365,978 | Strain | Dec. 26, 1944 |
| 2,466,386 | Curioni | Apr. 5, 1949 |